United States Patent
Williams et al.

(10) Patent No.: US 10,889,337 B1
(45) Date of Patent: Jan. 12, 2021

(54) TRUCK BED AIRFLOW ASSEMBLY

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 23 days.

(21) Appl. No.: 16/509,720

(22) Filed: Jul. 12, 2019

(51) Int. Cl.
 *B62D 35/00* (2006.01)
 *B62D 37/02* (2006.01)
 *B62D 33/02* (2006.01)
 *B62D 33/027* (2006.01)
 *B62D 33/023* (2006.01)

(52) U.S. Cl.
 CPC .............. *B62D 37/02* (2013.01); *B62D 33/02* (2013.01); *B62D 33/023* (2013.01); *B62D 33/0273* (2013.01); *B62D 35/001* (2013.01); *B62D 35/007* (2013.01)

(58) Field of Classification Search
 CPC .. B62D 33/02; B62D 33/0273; B62D 33/023; B62D 35/00; B62D 35/001; B62D 35/007; B62D 37/02
 USPC ...................................................... 296/180.1
 See application file for complete search history.

(56) References Cited

U.S. PATENT DOCUMENTS

| | | | | |
|---|---|---|---|---|
| 4,072,336 A | * | 2/1978 | Ruzicka | B62D 25/2054 180/89.1 |
| 5,277,444 A | * | 1/1994 | Stropkay | B62D 25/168 280/848 |
| 6,637,805 B2 | | 10/2003 | Rees | |
| 6,779,834 B1 | * | 8/2004 | Keller | B62D 35/001 296/180.4 |
| 7,665,799 B1 | * | 2/2010 | Winter, IV | B60P 3/40 296/183.1 |
| 8,196,996 B1 | * | 6/2012 | Campbell | B62D 35/001 296/180.4 |
| 8,303,024 B2 | * | 11/2012 | Alvi | B60J 9/04 296/180.1 |
| 9,371,097 B1 | | 6/2016 | Conny | |
| 9,969,445 B2 | | 5/2018 | Persson | |
| 10,017,214 B1 | | 7/2018 | Schroeck | |

(Continued)

FOREIGN PATENT DOCUMENTS

CN 204373123 U 6/2015
DE 102013217110 A1 3/2015

*Primary Examiner* — Gregory A Blankenship
(74) *Attorney, Agent, or Firm* — Dinsmore & Shohl LLP

(57) ABSTRACT

A vehicle includes a truck bed having a front wall, a tailgate, and a pair of sidewalls that extend between the front wall and the tailgate and an airflow assembly. The airflow assembly includes air inlets, air outlets, and a tubular duct. The air inlet is provided on an exterior surface of each of the pair of sidewalls. The air outlet is provided on an interior surface of each of the pair of sidewalls. At least two air ducts fluidly couple the air inlet and the air outlet on each of the pair of sidewalls. The tubular duct extends in the vehicle lateral direction to couple the air outlets on each of the pair of sidewalls such that air exiting the air outlets enters into the tubular duct and exits the tubular duct to create an air ramp flow path.

12 Claims, 3 Drawing Sheets

(56) References Cited

U.S. PATENT DOCUMENTS

| | | | | |
|---|---|---|---|---|
| 2008/0111390 A1* | 5/2008 | Smith | .................. | B62D 33/033 |
| | | | | 296/50 |
| 2011/0095564 A1* | 4/2011 | Chen | .................... | B62D 35/001 |
| | | | | 296/180.4 |
| 2015/0158439 A1* | 6/2015 | Zha | ...................... | B62D 35/008 |
| | | | | 296/1.03 |
| 2017/0082092 A1* | 3/2017 | Gaither | ................ | B60L 3/0076 |
| 2017/0240224 A1* | 8/2017 | Gaylard | ................ | B62D 25/04 |
| 2018/0170456 A1* | 6/2018 | Schroeck | .............. | B62D 35/008 |
| 2018/0178860 A1* | 6/2018 | Kishima | .............. | B62D 35/008 |
| 2018/0281876 A1* | 10/2018 | Gilotte | ..................... | F15D 1/00 |
| 2020/0079224 A1* | 3/2020 | Pien | ........................ | B60L 58/26 |
| 2020/0079225 A1* | 3/2020 | Samyn | ................... | B60L 58/26 |
| 2020/0269652 A1* | 8/2020 | Gallagher | .............. | B62D 25/04 |

* cited by examiner

TRUCK BED AIRFLOW ASSEMBLY

TECHNICAL FIELD

The present specification generally relates to a vehicle air intake assembly and, more specifically, to the vehicle air intake assembly that has aerodynamic performance features.

BACKGROUND

Automotive OEMs exert great effort to improve aerodynamics for vehicles, such as trucks, car haulers, and the like. A primary area for poor aerodynamic performance is a truck bed. A tailgate area is also a source of aerodynamic inefficiency. As one possible solution, physical structures are added to the truck bed area such as tonneau covers, fairings, roof spoilers, tailgate ramps, and the like. However, these can be expensive and take up precious cargo space in the truck bed, alter the look of the vehicle, and/or create other shortcomings such as limit the ability to add other accessories or other changes to the vehicle.

Accordingly, there is a need for improving aerodynamics for vehicles without covering the bed, occupying cargo floor space, or adding any accessories that interfere with, cover up, or take away from the look or performance of the vehicle.

SUMMARY

In one embodiment, a vehicle that includes an airflow assembly is provided. The vehicle further includes a truck bed. The truck bed includes a front wall, a tailgate, and a pair of sidewalls that extend between the front wall and the tailgate. The airflow assembly includes air inlets, air outlets, and a tubular duct. The air inlet is provided on an exterior surface of each of the pair of sidewalls of the truck bed. The air outlet is provided on an interior surface of each of the pair of sidewalls of the truck bed. At least two air ducts fluidly couple the air inlet and the air outlet. The tubular duct extends in the vehicle lateral direction to couple the air outlets on each of the pair of sidewalls such that air exiting the air outlets enters into the tubular duct and exits the tubular duct to create an air ramp flow path.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to a truck bed airflow assembly that improves aerodynamics of a vehicle (e.g., pickup truck, flatbed truck, car hauler, towing vehicle, and the like) without covering the bed, occupying cargo floor space, or adding any accessories which often interfere with, cover up, or take away from the look or performance of the vehicle.

The airflow assembly includes a truck bed having a front wall, a tailgate, and a pair of sidewalls that extend between the front wall and the tailgate. The airflow assembly includes air inlets provided on an exterior surface of each of the pair of sidewalls of the truck bed, air outlets provided on an interior surface of each of the pair of sidewalls of the truck bed, air ducts positioned between the exterior surface and the interior surface of each of the pair of sidewalls that connect the air inlets and air outlets, and a tubular duct that extends in a vehicle lateral direction to connect the air outlets on each of the pair of sidewalls such that air exiting the air outlets enters into the tubular duct and exits the tubular duct to create an air ramp flow path. In embodiments, the tubular duct may be connected adjacent the tailgate and may include a plurality of perforated holes to create a laterally uniform ramp to provide angular airflow over the tailgate. In other embodiments, the tubular duct is adjustable. In some embodiments, the tubular duct is positioned above the floor of the truck bed. In other embodiments, the tubular duct is positioned adjacent the floor of the truck bed.

The airflow assembly reduces air drag commonly associated with pickup trucks due to the fundamental shape and open design of the truck bed by providing an aerodynamic improvement in the truck bed while still allowing the bed to remain open and free for the intended purpose (i.e., picking up and hauling cargo).

Figure 1:
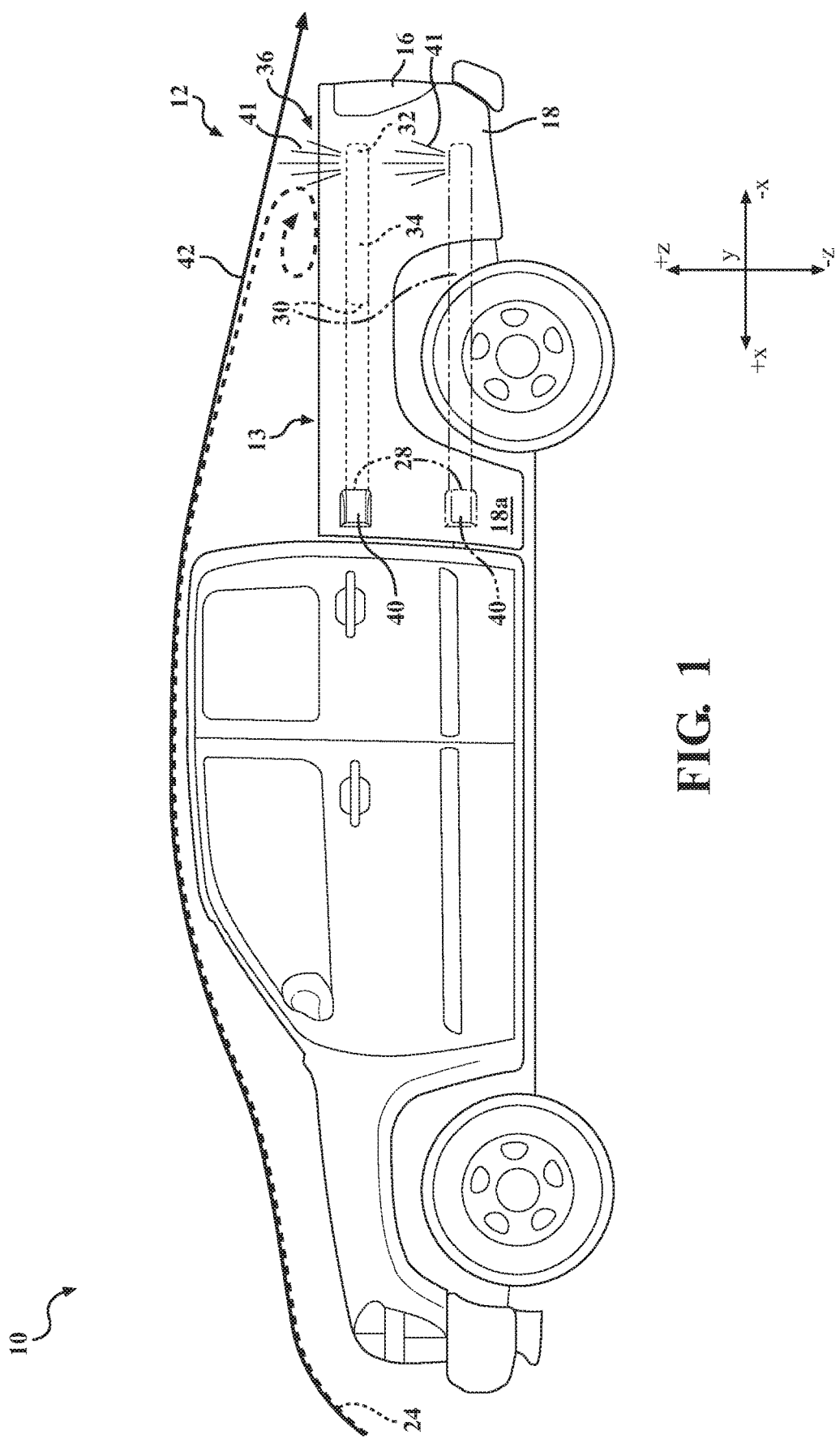
FIG. 1 schematically depicts a side view of a vehicle, according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" or "up" or "above" refer to the upward-downward direction of the vehicle (i.e., in the +/−vehicle Z-direction depicted in FIG. 1).

Vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

Figure 2:
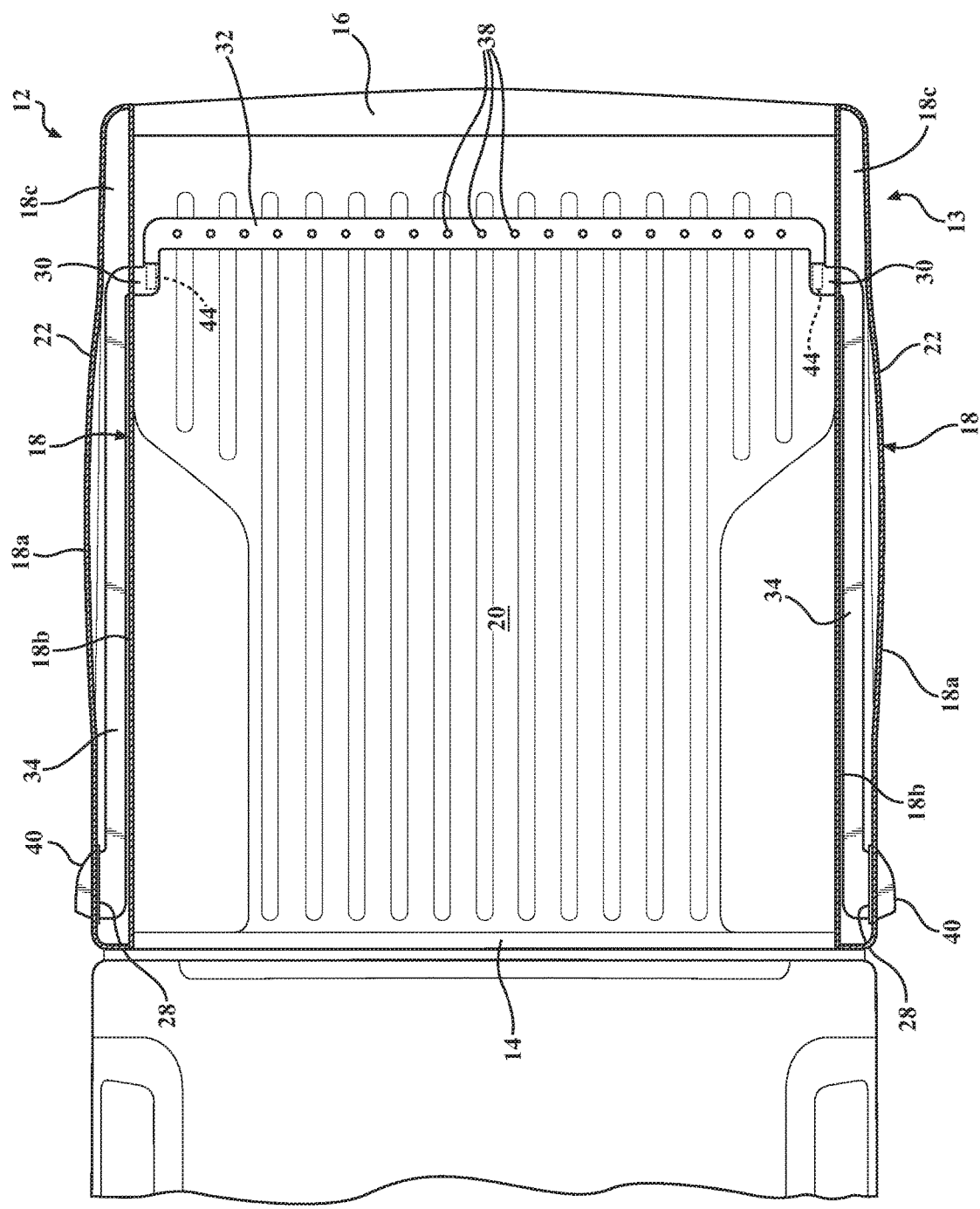
FIG. 2 illustrates a top down view of the vehicle of FIG. 1, according to one or more embodiments shown or described herein.
Figure 3:
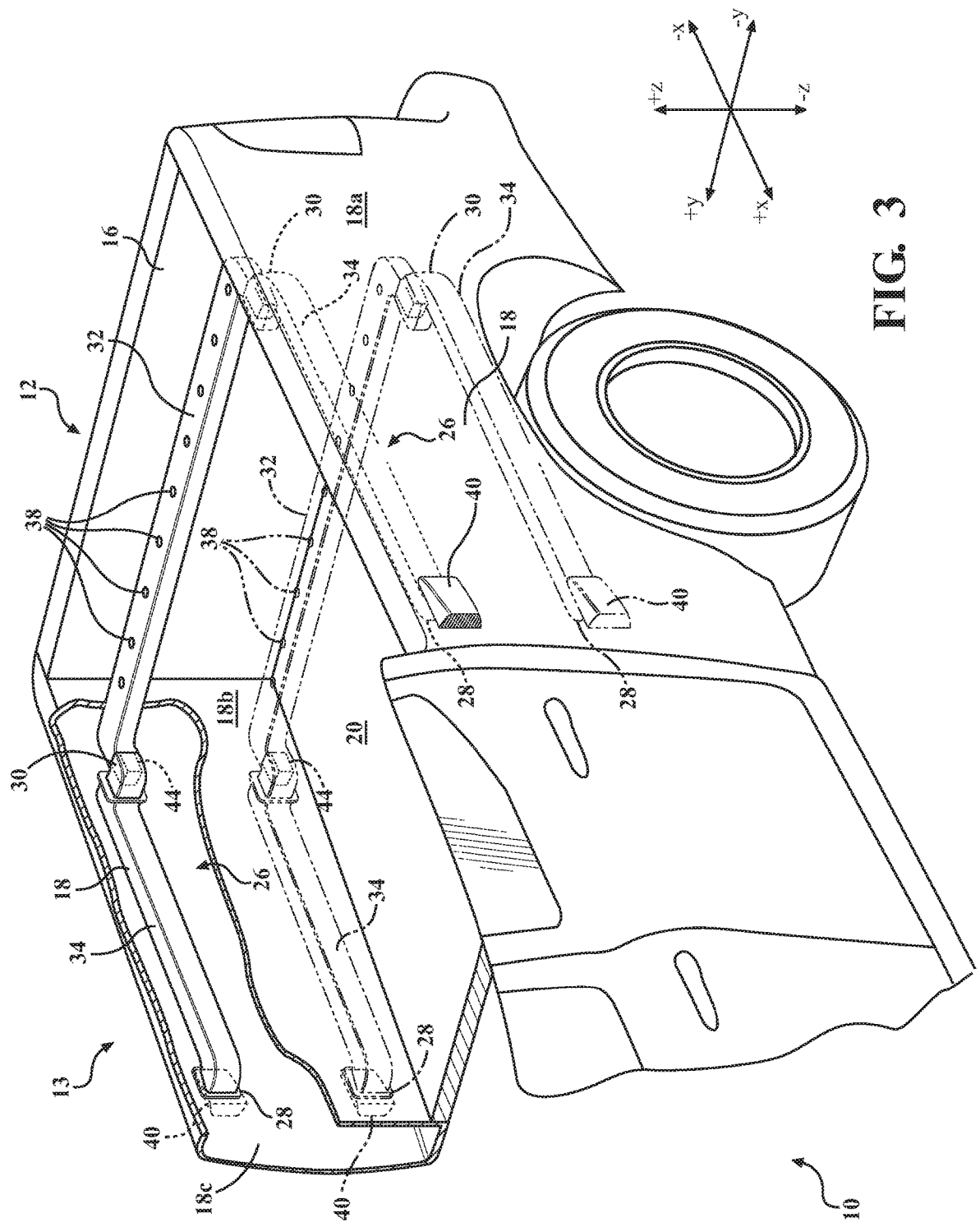
FIG. 3 schematically depicts a side perspective view of a truck bed area of the vehicle of FIG. 1, according to one or more embodiments described herein.

Referring to FIGS. 1-3, a vehicle 10 including a truck bed 12 is shown. The truck bed 12 generally includes a front wall 14, a tailgate 16 and a pair of sidewalls 18 that generally surround a truck bed area 13 formed in a void therein. The pair of sidewalls 18 each have an exterior surface 18a and an opposite interior surface 18b forming a cavity 18c therebetween. The tailgate 16 is adjustable and is shown pivoted around a connection with the vehicle 10 at a bottom portion of the tailgate 16 and the pair of sidewalls 18, but embodiments are not limited to this arrangement. It is contemplated that embodiments of the vehicle 10 may include a rear wall that is fixed in the upright position. The truck bed 12 further includes a floor 20 that extends between the pair of sidewalls 18, the tailgate 16 and the front wall 14. In some embodiments, the floor 20 of the truck bed 12 includes a lining such as a plastic liner, a rubber liner, and the like. Each of the pair of sidewalls 18 may each include a fender well 22.

Now referring to FIG. 1, generally, airflow 24 passes over the vehicle 10 and is captured in the truck bed 12 near the tailgate 16 such that turbulent air is forced into the truck bed 12 causing air drag. The shape and open design of the truck bed 12 creates a place for airflow to collect causing air drag on the vehicle. As such, aerodynamics of the vehicle are affected.

Now referring back to FIGS. 1-3, the truck bed 12 of the vehicle 10 includes an airflow assembly 26. The airflow assembly 26 is configured to improve airflow at the truck bed 12 and thus improves aerodynamics of the vehicle 10 by reducing drag, as discussed in greater detail herein.

The airflow assembly 26 includes a pair of air inlets 28, a pair of air outlets 30, a tubular duct 32, and at least two air ducts 34. Each of the pair of air inlets 28 are provided on the exterior surface 18*a* of each of the pair of sidewalls 18 of the truck bed 12. Each of the pair of air outlets 30 are provided on an interior surface 18*b* of each of the pair of sidewalls 18 of the truck bed 12. In some embodiments, the air inlets 28 are provided near or adjacent to the front wall 14 of the truck bed 12 while the air outlets 30 are provided near or adjacent to the tailgate 16 of the truck bed 12. One of the at least two air ducts 34 fluidly couples each of the pair of air inlets 28 to the corresponding pair of air outlets 30, respectively.

In some embodiments, each one of the at least two air ducts 34 travels from the each one of the pair of air inlets 28 to each one of the pair of air outlets 30 in the vehicle longitudinal direction (i.e. in the +/−X direction) inside the cavity 18*c* of the sidewalls 18 between the exterior surface 18*a* and the interior surface 18*b* In other embodiments, each one of the at least two air ducts 34 travel from the each one of the pair of air inlets 28 to each one of the pair of air outlets 30 in the vehicle longitudinal direction (i.e., in the +/−X-direction) along the interior surface 18*b* of the sidewalls 18. In this embodiment, it should be appreciated that each one of the at least two air ducts 34 may be removable from the truck bed area 13 such that full access to the truck bed area 13 for cargo, storage, and the like is permitted.

Further, in some embodiments, the at least two air ducts 34 extend from the pair of air inlets 28 to the pair of air outlets 30 in a generally linear fashion or parallel with respect to the floor 20. In other embodiments, the at least two air ducts 34 are curvilinear or arcuate as the at least two air ducts 34 travel from the each one of the pair of air inlets 28 to the each one of the pair of air outlets 30.

In some embodiments, each of the pair of air inlets 28 are fluidly coupled to each of the pair of air outlets 30 on each of the pair of sidewalls 18 via the at least two air ducts 34 above the floor 20 of the truck bed 12 in the vehicle vertical direction (i.e., in the +/−Z-direction). In other embodiments, each of the pair of air inlets 28 are positioned at the floor 20 of the truck bed 12 in the vehicle vertical direction (i.e., in the +/−Z-direction). In other embodiments, one of the of the pair of air inlets 28 is positioned adjacent to the floor 20 of the truck bed 12 in the vehicle vertical direction (i.e., in the +/−Z-direction) while the other one of the of the pair of air inlets 28 is positioned above the floor 20 of the truck bed 12 in the vehicle vertical direction (i.e., in the +/−Z-direction).

It should be appreciated that the one of the pair of air inlets 28, one of the pair of air outlets 30, and one of the at least two air ducts 34 that fluidly couple the one of the pair of air inlets 28 to the one of the pair of air outlets 30 is a single duct or tube. In other embodiments, multiple ducts or tubes fluidly couple the one of the pair of air inlets 28 to the one of the pair of air outlets 30 via one of the at least two air ducts 34. Each one of the at least two air ducts 34 may be tubes that have a diameter. It should be appreciated that the velocity of the airflow, the amount of airflow and the like depends, at least in part, on the size of the diameter of the at least two air ducts 34. In some embodiments, the diameter of each one of the at least two air ducts 34 is equal. In other embodiments, the diameter of each one of the at least two air ducts 34 is different from one another. It should be appreciated that the at least two air ducts 34 may be a plastic material such as a polyvinyl chloride. In other embodiments, the at least two air ducts 34 may be a rubber material, a metal material, and/or the like.

A pair of scoop vents 40 is provided on the exterior surface 18*a* of the pair of sidewalls 18 of the truck bed 12. That is, the pair of scoop vents 40 may be attached to the exterior surface 18*a* of each of the pair of sidewalls 18. The pair of scoop vents 40 fluidly couple to each one of the pair of air inlets 28 provided on each of the pair of sidewalls 18. It should be appreciated that the pair of scoop vents 40 have an opening configured to direct airflow into each one of the pair of air inlets 28. As such, the opening of each of the scoop vents 40 may vary based on amount of air required, velocity of air, and the like. In some embodiments, the opening of each of the pair of scoop vents 40 is adjustable. In some embodiments, the adjustment may be manual or may be actuated by an actuator such as a motor, a cylinder, and the like. In some embodiments, each of the pair of scoop vents 40 may include a filter to prevent the ingress of water or other debris from entering each of the pair of air inlets 28.

The pair of scoop vents 40 is generally provided where each one of the pair of air inlets 28 are provided on the exterior surface 18*a* of the pair of sidewalls 18 of the truck bed 12. As such, in embodiments where each of the pair of air inlets 28 are positioned at or below the floor 20 of the truck bed 12 in the vehicle vertical direction (i.e., in the +/−Z-direction), each of the pair of scoop vents 40 are positioned at or below the floor 20 of the truck bed 12 in the vehicle vertical direction (i.e., in the +/−Z-direction) as shown in broken lines in FIGS. 1 and 3. In embodiments where each of the pair of air inlets 28 are positioned above the floor 20 of the truck bed 12 in the vehicle vertical direction (i.e., in the +/−Z-direction), each of the pair of scoop vents 40 are positioned above the floor 20 of the truck bed 12 in the vehicle vertical direction (i.e., in the +/−Z-direction) as shown in solid lines in FIGS. 1 and 3.

Further, in embodiments where one of the of the pair of air inlets 28 is positioned at or below the floor 20 of the truck bed 12 in the vehicle vertical direction (i.e., in the +/−Z-direction) while the other one of the of the pair of air inlets 28 is positioned above the floor 20 of the truck bed 12 in the vehicle vertical direction (i.e., in the +/−Z-direction), then one of the pair of scoop vents 40 is also positioned at or below the floor 20 of the truck bed 12 in the vehicle vertical direction (i.e., in the +/−Z-direction) and the other one of the pair of scoop vents 40 is positioned above the floor 20 of the truck bed 12 in the vehicle vertical direction (i.e., in the +/−Z-direction).

The tubular duct 32 extends in the vehicle lateral direction (i.e., in the +/−Y-direction) to connect each of the pair of air outlets 30 on each of the pair of sidewalls 18 such that air exiting each of the pair of air outlets 30 enters into the tubular duct 32, which then exits the tubular duct 32 to create an air ramp flow path 36. In some embodiments, the tubular duct 32 extends in the vehicle lateral direction (i.e., in the +/−Y-direction) across the floor 20 of the truck bed 12. In other embodiments, the tubular duct 32 extends in the vehicle lateral direction (i.e., in the +/−Y-direction) above the floor 20 of the truck bed 12 in the vehicle vertical direction (i.e. in the +/−Z-direction). Further, in some embodiments, the tubular duct 32 extends in the vehicle lateral direction (i.e., in the +/−Y-direction) adjacent to the tailgate 16 of the truck bed 12.

In some embodiments, a portion of the tubular duct 32 is at least partially exposed to an interior of the truck bed area 13 between the front wall 14, the tailgate 16, and the pair of sidewalls 18 of the truck bed 12. The at least partially exposed portion of the tubular duct 32 includes a plurality of perforated holes 38 that create the air ramp flow path 36. In some embodiments, the air ramp flow path 36 created by the plurality of perforated holes 38 is a laterally uniform ramp in the vehicle lateral direction (i.e. in the +/−Y-direction) to provide an angular airflow 41 above the tailgate 16 in the vehicle vertical direction (i.e. in the +/−Z-direction). In some embodiments, a diameter of each one of the plurality of perforated holes 38 is uniform. In other embodiments, the diameter of each one of the plurality of perforated holes 38 is non-uniform or irregular. It should be appreciated that the velocity of the angular airflow 41 may be adjusted by increasing or decreasing the diameter of each one of the plurality of perforated holes 38, as appreciated by those skilled in the art.

In some embodiments, the plurality of perforated holes 38 are an elongated slot that forms an air knife shape that may be disposed in the at least partially exposed portion of the tubular duct 32. Further, it should be appreciated that the at least one knife shape increases the velocity of the angular airflow 41. It is contemplated that other shapes may also be used to control the velocity of the airflow such as squares, rectangles, ovals, ellipses, and the like.

It should be appreciated that the at least partially exposed portion of the tubular duct 32 may be adjusted in the longitudinal direction (i.e., in the +/−X− direction). In some embodiments, the at least partially exposed portion of the tubular duct 32 includes a telescoping section 44 at the air outlet 30 that permits versatility in moving or adjusting of the tubular duct 32. In embodiments, the telescoping section 44 slides in and out of the air outlet 30 in the longitudinal direction (i.e., in the +/−X− direction) and includes a plurality of bores that allow the telescoping section 44 to be locked into position by a fastener such as a pin, a bolt and nut, and the like. In some embodiments, the at least partially exposed portion of the tubular duct 32 may be removable from the truck bed area 13 such that full access to the truck bed area 13 for cargo storage, removal of cargo, and the like is permitted.

Now referring to FIG. 1, generally, airflow 42, as shown in a solid line in FIGS. 1 and 3 is a laminar flow as the airflow 42 passes over the vehicle 10, because the airflow 42 is forced above the tailgate 16 by the air ramp flow path 36 created by the plurality of perforated holes 38. As such, the air ramp flow path 36 created by the plurality of perforated holes 38 forces the airflow 42 up in the vehicle vertical direction (i.e. in the +/−Z-direction) keeping the airflow 42 above the tailgate 16 and forcing the airflow 42 to maintain the laminar flow. On the other hand, the airflow 24, as shown in broken lines in FIG. 1, is the airflow that is captured in the truck bed 12 near the tailgate 16 without laminar flow that causes air drag. Airflow 24, when forced above and over the tailgate 16 in the vehicle vertical direction (i.e. in the +/−Z-direction) by the air ramp flow path 36 created by the plurality of perforated holes 38 becomes airflow 42 such that air drag is reduced and increasing the aerodynamics of the vehicle 10.

As such, it should be appreciated that the airflow assembly 26 reduces air drag that commonly occurs in the truck bed area 13 of the vehicle 10 due to the fundamental shape and open design of the truck bed 12. The position of each of the scoop vents 40 permits better airflow at a higher velocity such that the air ramp flow path 36 created by the plurality of perforated holes 38 uniformly and laterally distributes the airflow that is intake by each one of the pair of the scoop vents 40 such that the airflow 42 is pushed or forced above the tailgate 16 in the vehicle vertical direction (i.e., in the +/−Z-direction).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle having an airflow assembly, the vehicle comprising:
   a truck bed comprising a front wall, a tailgate, and a pair of sidewalls that extend between the front wall and the tailgate; and
   an airflow assembly comprising:
      an air inlet provided on an exterior surface of each of the pair of sidewalls of the truck bed;
      an air outlet provided on an interior surface of each of the pair of sidewalls of the truck bed;
      at least two air ducts are positioned within a cavity of each of the pair of sidewalls, the cavity disposed between the exterior surface and the interior surface of each of the pair of sidewalls, the at least two air ducts fluidly couple the air inlet and the air outlet on each of the pair of sidewalls; and
      a tubular duct that extends in a vehicle lateral direction to fluidly couple to the air outlet on each of the pair of sidewalls such that air exiting the air outlet enters into the tubular duct and exits the tubular duct to create an air ramp flow path.

2. The vehicle of claim 1 wherein a portion of the tubular duct is at least partially exposed to an interior of a truck bed area between the front wall, the tailgate, and the pair of sidewalls of the truck bed.

3. The vehicle of claim 2 wherein the at least partially exposed portion of the tubular duct comprises a plurality of perforated holes that create the air ramp flow path.

4. The vehicle of claim 2 wherein the truck bed further comprises a floor extending between the front wall, the tailgate, and the pair of sidewalls of the truck bed, the tubular duct is fluidly connected to the air outlet on each of the pair of sidewalls above the floor in a vehicle vertical direction.

5. The vehicle of claim 2 wherein the truck bed further comprises a floor extending between the front wall, the tailgate, and the pair of sidewalls of the truck bed, the air outlet on each of the pair of sidewalls is fluidly connected to the air inlet on each of the pair of sidewalls above the floor in a vehicle vertical direction.

6. The vehicle of claim 2 wherein the truck bed further comprises a floor extending between the front wall, the tailgate, and the pair of sidewalls of the truck bed, the air inlet on each of the pair of sidewalls is positioned below the floor in a vehicle vertical direction.

7. The vehicle of claim 6 wherein the air outlet on each of the pair of sidewalls are fluidly coupled to the air inlet on each of the pair of sidewalls above the floor in the vehicle vertical direction.

8. The vehicle of claim 1 wherein the air ramp flow path is a laterally uniform ramp to provide an angular airflow above the tailgate in a vehicle vertical direction.

9. The vehicle of claim 1 further comprising:
   a pair of scoop vents is provided on the exterior surface of the pair of sidewalls of the truck bed, the pair of scoop vents fluidly coupled to the air inlet on each of the pair of sidewalls.

10. The vehicle of claim 5 further comprising:
    a pair of scoop vents is provided on the exterior surface of the pair of sidewalls of the truck bed, the pair of scoop vents fluidly coupled to the air inlet on each of the pair of sidewalls above the floor in the vehicle vertical direction.

11. The vehicle of claim 1 further comprising:
    a floor extending between the front wall, the tailgate, and the pair of sidewalls of the truck bed; and
    a pair of scoop vents provided on the exterior surface of the pair of sidewalls of the truck bed, the pair of scoop vents fluidly coupled to the air inlet on each of the pair of sidewalls at the floor in a vehicle vertical direction such that the tubular duct is in contact with the floor when extending in the vehicle lateral direction.

12. The vehicle of claim 2 wherein the least partially exposed portion of the tubular duct may be adjusted in a vehicle longitudinal direction between the front wall and the tailgate.

* * * * *